UNITED STATES PATENT OFFICE.

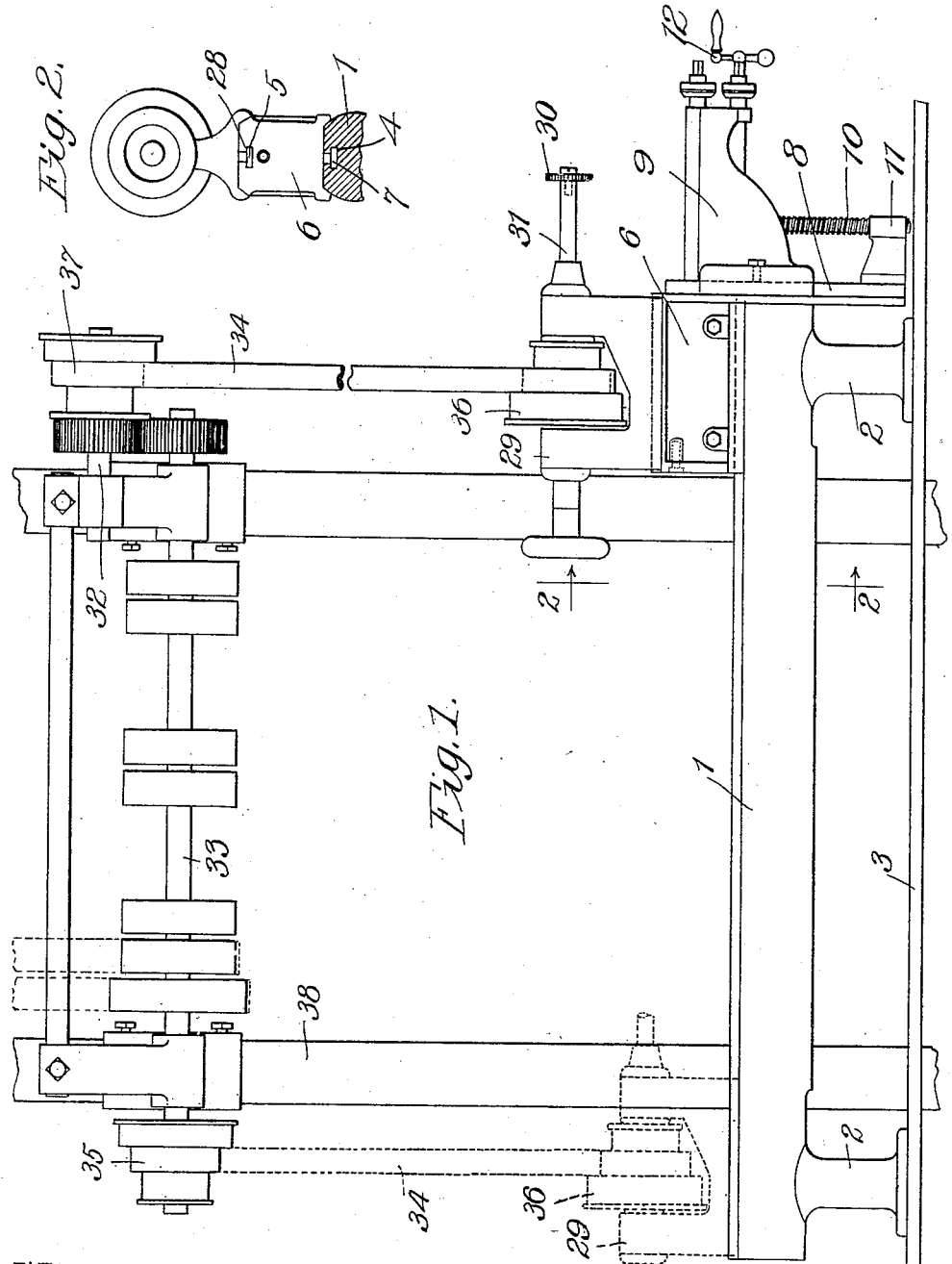

FRANKLIN HARDINGE, OF CHICAGO, ILLINOIS.

LATHE STRUCTURE.

No. 908,664.  Specification of Letters Patent.  Patented Jan. 5, 1909.

Application filed January 15, 1907. Serial No. 352,461.

*To all whom it may concern:*

Be it known that I, FRANKLIN HARDINGE, citizen of the United States, residing at Chicago, in the county of Cook and State of Illinois, have invented a certain new and useful Improvement in Lathe Structures, of which the following is a full, clear, concise and exact description, reference being had to the accompanying drawings, forming a part of this specification.

My invention relates to lathe structures, its object being to provide attachments which, when applied to the lathe structure, form a combination structure which may be utilized for a variety of purposes and for different kinds of work which heretofore was carried out on separate machines.

My invention applies particularly to bench lathes and to milling attachments therefor, and will be best understood when described with reference to the accompanying drawings, in which—

Figure 1 illustrates a lathe with an attachment applied thereto and counter-shafting for driving the machine, and Fig. 2 is an end view of the attachment looking from line 2—2 of Fig. 1.

As shown in Fig. 1, the lathe proper comprises the bed frame 1 supported from legs 2—2, which rest on a table 3. The bed frame has the usual locking channel 4 for receiving the locking heads 5 of the head stock, tail stock and other lathe parts. The attachment shown comprises the supporting frame or block 6, from whose lower face extend locking heads 7 for engaging in the locking channel in the lathe bed frame. Secured to the end of the supporting block and extending downwardly therefrom is a guide bar or plate 8, on which a table 9 is mounted to reciprocate vertically, reciprocation being caused by a screw 10 engaging in bearing 11 extending from the lower end of guide plate 8, said screw being rotated in some suitable manner upon turning of crank handle 12. The upper side of the supporting block 6 has a locking channel 28 for receiving the locking head or heads of the head stock 29 of the lathe. When used in its ordinary capacity, the head stock is usually at the left end of the bed frame, as shown in dotted lines in Fig. 1. When the attachment is to be used, the head stock is mounted on the block 6, as shown in full lines, and tools 30 are mounted at the end of the spindle 31 for operating on work carried by the table 9. The block 6, after being slid onto the lathe bed frame, can be secured in any well known manner, and the head stock can also be secured in any well known manner to the top of the block 6. The guide frame or plate 8 engages against the right end of the bed frame to give rigidity to the attachment.

It is desirable that the same belt may be used for driving the head stock when used in its ordinary capacity or when in position on the mounting block. I therefore provide a counter-shaft 32 parallel to the driving shaft 33 and displaced therefrom a distance equal to the vertical distance to which the head stock is displaced when transferred from the lathe head to the block 6. The belt 34 engages the driving cone 35 at the left end of the driving shaft, and the cone pulleys 36 of the head stock, when the head stock is in its normal position at the left end of the lathe bed. The counter-shaft terminates in cone pulleys 37, which are disposed above the right end of the lathe bed, so that the belt 34 may connect said pulleys with the pulleys 36 when the lathe head is in position on the block 6. The counter-shafting can be supported from a wall or ceiling, or, as shown, can be supported from uprights 38 which extend from the floor and which also form legs for the table 3, this arrangement making an integral structure of the table, lathe and shafting.

When the attachment is to be used, it can quickly be brought into position by sliding the block 6 into the locking channel of the lathe bed and the head stock transferred to the top of the block. When the lathe is to be used in its ordinary capacity, the attachment is quickly removed and the head stock applied in place of the block 6. The belt suitable for either position of the head stock can be very quickly transferred from one position to the other.

I desire to secure the following claim by Letters Patent:

In combination, a bench lathe having a bed frame provided with a locking channel and a head stock for engaging in said channel, a supporting block or frame engaging in said locking channel at one end of the bed plate, and work holding apparatus carried by said block, there being a locking channel in the upper face of the block for receiving the head stock of the lathe.

In witness whereof, I hereunto subscribe my name this 9th day of January A. D., 1907.

FRANKLIN HARDINGE.

Witnesses:
CHARLES J. SCHMIDT,
ARTHUR H. BOETTCHER.